APPARATUS PROVIDING A ROTATING DIRECTIVE ANTENNA FIELD PATTERN ASSOCIATED WITH A SPINNING BODY

Original Filed Sept. 28, 1961 4 Sheets-Sheet 1

INVENTOR.
HAROLD A. ROSEN,
BY
Noel B. Hammond
AGENT

INVENTOR.
HAROLD A. ROSEN,
BY
Noel B. Hammond
AGENT.

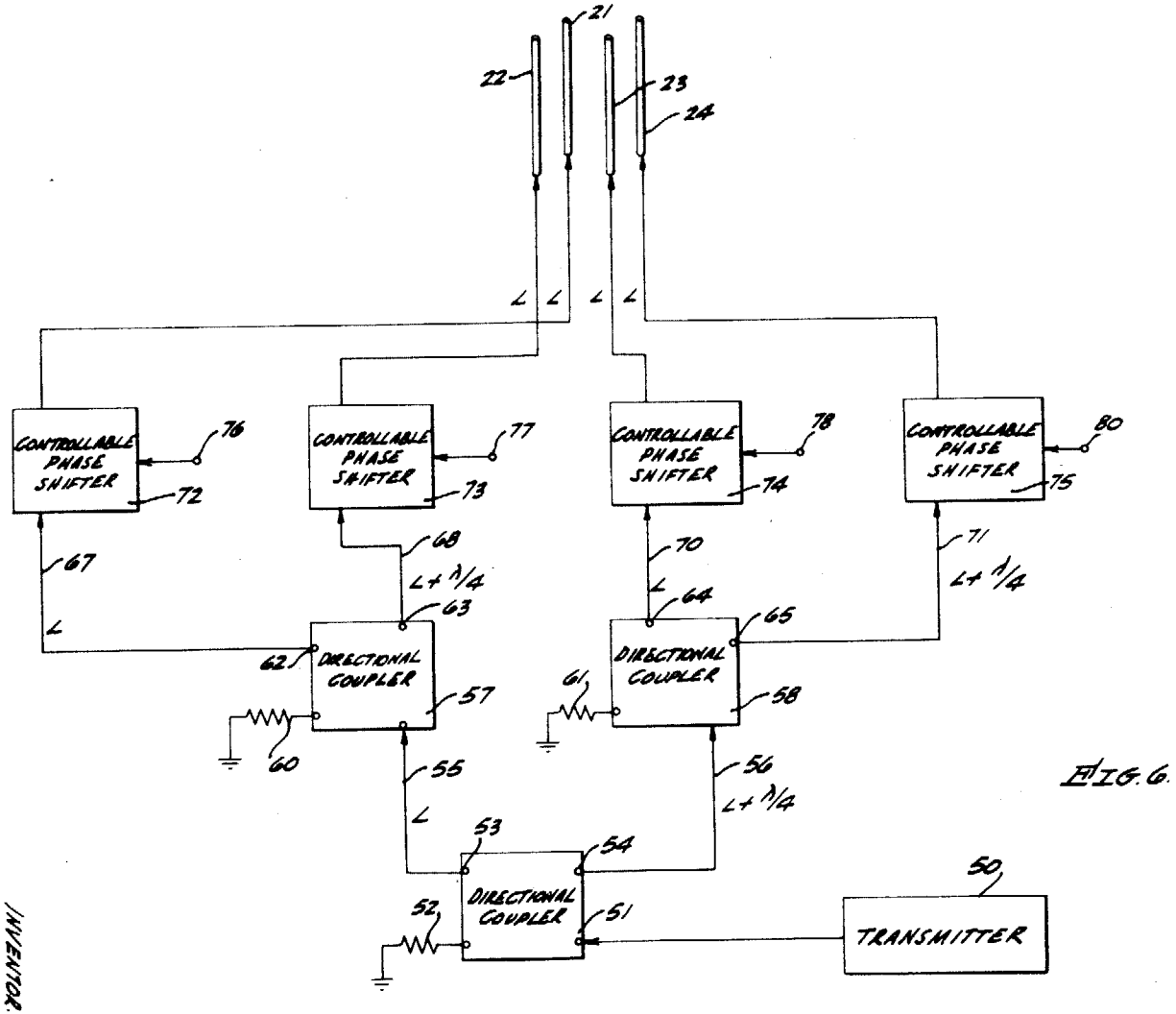
INVENTOR.
HAROLD A. ROSEN,
BY Noel B. Hammond
AGENT.

INVENTOR
HAROLD A. ROSEN,
BY
Noel B. Hammond
AGENT.

United States Patent Office

Re. 26,680
Reissued Oct. 7, 1969

26,680

APPARATUS PROVIDING A ROTATING DIRECTIVE ANTENNA FIELD PATTERN ASSOCIATED WITH A SPINNING BODY

Harold A. Rosen, Santa Monica, Calif., assignor to Hughes Aircraft Company, Culver City, Calif., a corporation of Delaware Original No. 3,133,282, dated May 12, 1964, Ser. No. 141,527, Sept. 28, 1961. Application for reissue Apr. 8, 1966, Ser. No. 547,058
Int. Cl. H04b 7/00
U.S. Cl. 343—100 9 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus for producing a rotatable directional antenna pattern is disclosed. The apparatus employs an antenna array comprising a plurality of longitudinal rod-like elements disposed symmetrically about a central axis. Each element is a collinear slot array of the coaxial type. The elements are connected to a source of radio frequency energy by directional couplers and electrically controllable phase shifters. The control signals for the phase shifters are derived from pulses from light-sensitive cells. The desired control waveforms are produced from the pulses by appropriate circuits.*

This invention relates to directive radio antenna systems and, more particularly, to apparatus for producing a [rotating] *rotatable* directive antenna field pattern *for a radiating system. Such a field pattern may be* associated with a spinning body, the field pattern rotating counter to the spin of the body and at the same angular velocity, thereby de-spinning the pattern.

In a space vehicle such as a communication satellite, for example, it is desirable that any radio antenna thereon be highly directive so that the most effective use may be made of the limited amounts of radio energy available for transmission. One type of antenna system for space vehicles utilizes an antenna having a directive field pattern that is mounted on a movable member whose orientation is automatically varied relative to the space vehicle in order to maintain the antenna field pattern constantly directed in the desired direction. Alternatively, the attitude of the vehicle itself may be automatically controlled, the orientation of the antenna remaining constant, or the attitude of both may be automatically controlled. Any of these expedients requires a large and heavy electro-mechanical control system to automatically control the orientation of the antenna or the vehicle.

To eliminate the necessity for complex automatic orientation systems in a communication satellite orbiting the earth, the satellite may be caused to spin about an axis as it traverses its orbit to provide orientation stability, with the spin axis perpendicular to a line from the earth to the satellite. A directive antenna may then be used to provide a uniform circular antenna field pattern about the spin axis that is narrow in width about a plane extending through the center of the satellite perpendicular to the spin axis. Some portion of this pancake-like antenna pattern is always directed toward the earth as the satellite spins on its axis. Although this arrangement provides a gain improvement of eight decibels over an omidirectional field pattern, it is inefficient in that not all of the radiated energy is directed toward the earth. The most efficient antenna is one producing a pencil-like beam or lobe of narrow width that is directed to the earth. Such an antenna provides a gain improvement of approximately 18 decibels.

To provide a pencil-like directive antenna field pattern in a fixed direction from a spinning body, the antenna pattern must rotate counter to the spin of the body and at the same angular velocity. Although antenna systems providing rotating field patterns have been in existence for use in radio beacons, direction finding equipment and the like, this apparatus is unsuitable for use in space vehicles for several reasons. The antenna field patterns produced thereby are usually not of the highly directive pencil-beam type. The apparatus is large and heavy, usually utilizing large rotating structures such as apertured masks or cages, large rotating antenna elements or the like. The prior art apparatus is not adapted for use on a spinning body, there being no provisions for counter rotation of the field pattern at the same angular velocity thereof.

Accordingly, it is an object of the present invention to provide [a predetermined] *improved apparatus producing rotatable* antenna directivity from a [radio] *radiating* system [on a spinning body].

Another object of the invention is the provision of apparatus for increasing antenna power gain from a spinning communication satellite.

[Yet another] *Another* object of the present invention is to provide apparatus for improving the antenna gain and directivity from *rotatable beam radiating* [radio] equipment [on a spinning body] that is simple and light in weight.

A further object of the invention is the provision of *improved* electrical means providing a [rotating] *rotatable* directive antenna field pattern [associated with a spinning body] *for a radiating system.*

A still further object of the present invention is to provide circuit means for causing a rotating antenna field pattern associated with a spinning body to rotate counter to the spin thereof and at the same angular velocity thereof, thereby de-spinning the pattern.

In accordance with these and other objects of the invention, *in the illustrated embodiment thereof* a body adapted to spin about an axis is provided with an antenna array, the relative disposition and excitation phase of the various elements thereof being such that a narrow beam type of field pattern is formed perpendicular to the spin axis of the body. The excitation phase is periodically modulated or varied by electrically controlled phase shifters to cause the beam to rotate counter to the spin of the body and at the same angular velocity thereof. The rotation of the antenna field pattern is synchronized with the spin of the body by a control circuit to maintain the antenna field pattern pointing in a desired direction.

The following specification and the accompanying drawings describe and illustrate an exemplification of the present invention. Consideraton of the specification and drawings will provide a complete understanding of the invention including the novel features and objects thereof. Like reference characters are used to designate like parts throughout the figures of the drawings.

FIG. 6 is a schematic circuit diagram of the interconnection of the antenna system of the present invention; and, FIG. 7 is a schematic circuit diagram of a synchronizing system for use with the antenna system of the present invention.

Figure 1:
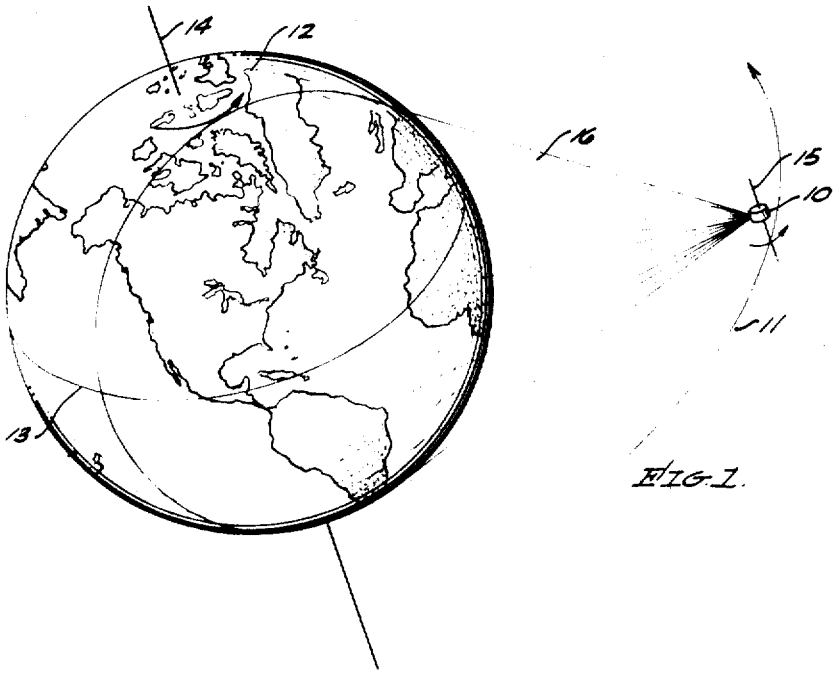
FIG. 1 is a perspective view of the earth and an orbiting satellite associated therewith and illustrating a directive antenna field pattern of the type contemplated by this invention.

Referring now to FIG. 1, there is illustrated a space vehicle, such as a satellite 10, traversing an orbit 11 about the earth 12. The staellite 10 is in the equatorial plane of the earth, that is, a plane passing through the equator 13 also passes through the orbit 11 of the satellite 10. The satellite 10 travels in the same direction as the earth 12 does in rotating about its axis 14 and also travels at the same angular velocity thereof. Thus, the satellite 10 rotates with the earth 12 to remain stationary over a single geographic area thereof. Such an orbit 11 is commonly referred to as being of the synchronous, stationary, or 24-hour type. Although described with reference to a stationary orbit, the invention is also applicable to satellites in other orbits. The satellite 10 also spins about a spin axis 15 as it traverses the orbit 11 in order to provide attitude stabilization thereof. The spin axis 15 of the satellite 10 is parallel to the earth's rotational axis 14. For other than equatorial orbits, the spin axis is aligned normal to the orbital plane. Methods of placing the satellite 10 into its orbit 11 are known and form no part of the present invention. Furthermore, methods of spinning the satellite 10 about its spin axis 15 and orienting the spin axis 15 parallel to the earth's axis 14 are also known and form no part of the present invention. For example, the spin of the satellite 10 may be residual spin imparted by the launching vehicle and the spin axis 15 may be oriented parallel to the earth's axis 14 by precession caused by applying a moment to the satellite 10 in a predetermined direction.

FIG. 1 also illustrates an antenna field pattern 16 or beam which is optically conical and extends from the satellite 10 to the earth 12 with the apex of the conical pattern 16 being at the satellite 10. The field pattern 16 intersects a large area on the surface of the earth 12. FIG. 1 is solely representative and is not to scale, the relative size of the satellite 10 to that of the earth 12 and the distances therebetween being disproportionate for convenience. Accordingly, although the included angle of the conical field pattern 16 is represented as being rather large in FIG. 1, the actual angle is relatively small, being approximately 17.3 degrees. The satellite 10 is at an altitude of 22,300 miles above the earth 12 and, at this distance the provision of an extremely directive antenna field pattern 16 is of great importance. As mentioned hereinbefore, the gain of the pencil beam antenna pattern 16, which it just encompasses the earth 12 from an altiude of 22,300 miles, is approximately 18 decibels.

Figure 2:
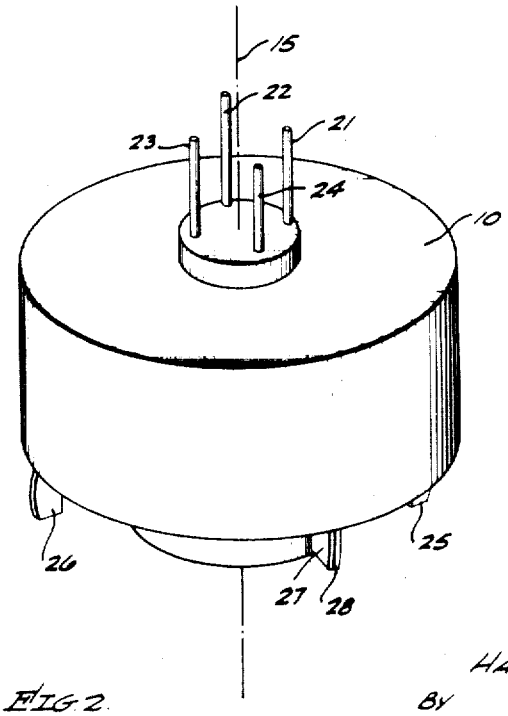
FIG. 2 is a perspective view of a space vehicle suitable for communication uses and illustrating an antenna array constructed in accordance with the present invention and associated solar sensors.

FIG. 2 illustrates an array of four antenna elements 21–24 disposed on the satellite 10 for forming a narrow pencil beam field pattern 16. Many other different types of antenna arrangements will also form a directive antenna field pattern suitable for use in accordance with the present invention and the embodiment herein shown and described is by way of example only. The satellite 10, of the present example, is generally cylindrical about the spin axis 15. The antenna elements 21–24, which will be described in more detail hereafter, are longitudinal, rod-like members and project parallel to the spin axis 15 from one of the flat surfaces of the satellite 10. The antenna elements 21–24 are identical and are disposed symmetrically about the spin axis 15 of the satellite 10 at an appreciable fraction of a wavelength therefrom. A satisfactory radial spacing between the antenna elements 21–24 and the spin axis 15 is one-quarter wavelength, for example, although other spacings may be used. In the present example, the antenna is designed for operation in the vicinity of 2000 megacycles at which frequency the wavelength involved is approximately 6 inches. In the present embodiment of the invention, four antenna elements 21–24 are provided, although any number from a minimum of two may be utilized. The gain improvement is in general proportional to the number of elements, however, if a greater number of elements are symmetrically located at the same radial distance from the spin axis 15 as provided for the lesser number of elements, the spacing between the elements will be less and there will be an increase of interaction or mutual coupling between them that will adversely affect the radiation impedance to some extent so that the optimum gain improvement factor may not be achieved.

A first solar sensor 25, associated with the first antenna element 21, projects from the flat surface of the satellite 10 that is opposite the flat surface from which the antenna elements 21–24 project. The solar sensor 25 is a generally elongated, flat assembly that is aligned with and intersected by a plane passing through the spin axis 15 and the associated antenna element 21. A second solar sensor 29 (not shown in FIG. 2) is associated with the second antenna element 22 and is angularly displaced around the circumference of the satellite 10 from the first solar sensor 25 to lie in a plane passing through the spin axis 15 and the second antenna element 22. Similarly, third and fourth solar sensors 26 and 27 also project from the flat surface of the satellite 10 at the circumference thereof and are aligned with the third and fourth antenna elements 23 and 24, respectively. Each of the solar sensors is provided with a longitudinal, slit-like opening 28 that is aligned with the plane passing through the respective antenna element. Within each of the solar sensors are sensing elements (not shown) such as cadmium sulfide or silicon cells that produce an electrical voltage in response to sunlight passing through the opening 28.

Figure 3:
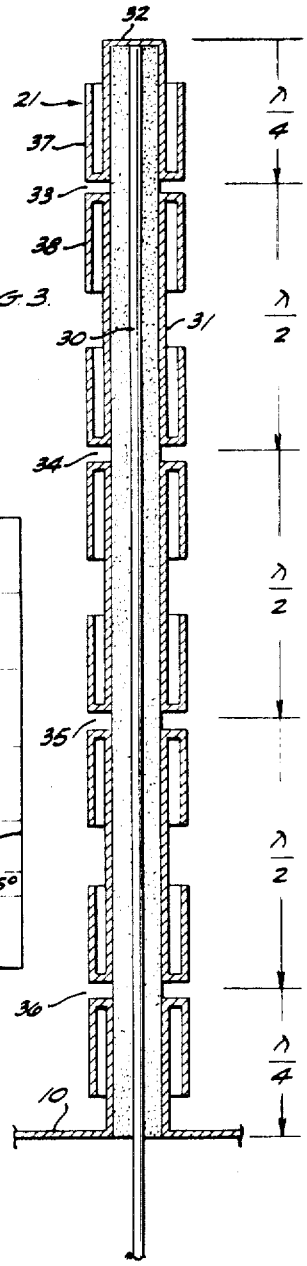
FIG. 3 is a cross sectional elevational view of a single antenna element in accordance with the present invention.

The construction of the first antenna element 21 is illustrated in FIG. 3 and is typical of the remaining elements 22–24. The antenna element 21 is a collinear slot array of the coaxial type and comprises a coaxial transmission line having an inner conductor 30 and an outer conductor 31. The transmission line is provided with a short-circuiting member 32 at the distal end and is provided with four circumferential openings or slots 33–36 in the outer conductor 31. The slots 33–36 are spaced one-half a free space wavelength apart and the end slots 33 and 36 are one-quarter wavelength away from the ends of the antenna element 21. The surface of the satellite 10 is conductive and forms a ground plane for the antenna system. The slots 33–36 are excited with an in-phase relationship to obtain a broadside field pattern, that is, a circular pattern perpendicular to the axis of the antenna element 21. To accomplish this, the electrical distance between the slots 33–36 has been made equal to a whole wavelength by folding the outer conductor 31 adjacent the slots 33–36, as at portions 37 and 38 adjacent the distal slot 33, to obtain the necessary phase shift. Alternatively, this may be accomplished, if desired, by utilizing a material having a dielectric constant of 4 within the coaxial transmission line. Such a material is titanium dioxide loaded with iron particles, for example.

Figure 4:
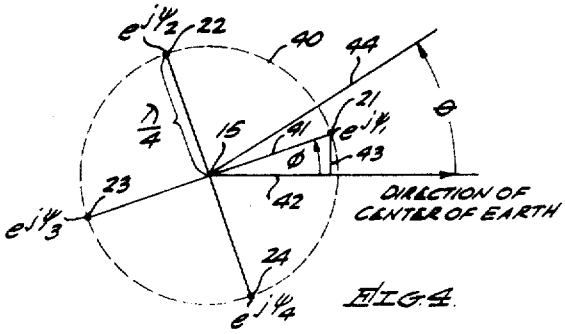
FIG. 4 is a plan view of an antenna system in accordance with the present invention illustrating the phase relationship of the several elements thereof.

FIG. 4 is a plan view of the antenna array showing the relative location of the elements 21–24 and is for the purpose of identifying symbols to be used in subsequent analysis. The antenna elements 21–24 are located on a circle 40 having a radius equal to one-quarter wavelength and are symmetrically displaced from each other. Taking the amplitude as unity, the radiated field from the first antenna element 21 is expressed vectorially in exponential form as $e^{j\psi_1}$. The field from the second antenna element 22 is $e^{j\psi_2}$; for the third antenna element 23, $e^{\psi_3}$; for the fourth antenna element 24, $e^{j\psi_4}$. The phase angle $\psi$ indicates the time phase of the excitation potential applied to the related antenna element. The angle $\varphi$ or spin angle is the angle between a radial line 41 from the spin axis 15 to the first antenna element 21 and a line 42 from the spin axis 15 in the direction of the center of the earth and varies as the satellite 10 spins about the axis 15. The field pattern of the antenna is at a maximum along the line 42 to the center of the earth. A perpendicular line 43 from the line 42 to the earth passing through the first antenna element 21 forms a right triangle having the radial line 41 for a hypotenuse, the earth line 42 for an adjacent side, and the perpendicular line 43 for an opposite side. The angle $\varphi$ is an angle between the line 42 in the direction of the center of the earth and a line 44 in which the antenna field pattern is less than maximum.

In order that the far field (the field at a distance at which the [anntenna] *antenna* array appears to be a point source) contributed by each of the antenna elements 21–24 have an in-phase relationship in the direction of the earth, the excitation phase angles $\psi$ are assigned values that account for the different space delays (differences in path length along the line 42 to the earth) of the individual elements 21–24. The excitation phase angle for the first antenna element 21 may be found by considering the right triangle associated therewith. The amount of space delay of the first antenna element 21, or the component of the difference in path length from the center of the array at the spin axis 15 along the line 42 to the earth, by $$\text{trigonometry} = \text{hypotenuse } d_\chi \cos \varphi$$

The hypotenuse is one-quarter wavelength which corresponds to a phase shift of $\pi/2$ radians. Accordingly, the space delay of the $$\text{first antenna element } 21 = -\psi/2 \cos \varphi$$

The first element 21 is closer to theearth than the reference point (the spin axis 15), hence its delay is negative. Hence, the excitation phase angle for the first element 21, $\psi_1 = -\pi/2 \cos \varphi$. The sign convention used here for excitation phase angle is minus for phase lag and plus for phase lead. Inasmuch as the antenna elements 21–24 are angularly separated by 90° or $\pi/2$ radians, the excitation phase angles of the remaining elements 22–24 are found by trigonometry to be for the Second element 22, $\psi_2 = -\pi/2 \cos (\varphi + \pi/2)$
Third element 23, $\psi_3 = -\pi/2 \cos (\varphi + \pi)$
Fourth element 24, $\psi_4 = -\pi/2 \cos (\varphi + 3\pi/2)$.

Stated generally for the four element array of the present example, the excitation phase angle of each of the elements 21–24 is $$\psi_i = -\frac{\pi}{2} \cos \left[ \phi + (i-1) \frac{\pi}{2} \right]$$

where $i$ is the number of the particular one of the four antenna elements 21–24 being considered. Thus, to provide an antenna field pattern that is at a maximum along a line 42 in the direction of the center of the earth as the satellite 10 spins about its spin axis 15, the excitation potential applied to each of the antenna elements 21–24 varies sinusoidally in phase between the limits of ±90°. Hence, a total phase shift of 180° must be variably provided for each of the antenna elements 21–24. Furthermore, there is a 90° phase difference between the rate of change of phase between adjacent ones of the antenna elements 21–24. That is, when the phase of the excitation potential applied to the first antenna element 21 is passing through 0° going toward 90°, the phase of excitation potential applied to the second antenna element 22 is passing through —90° going toward 0°, the phase of the third element 23 is passing through 0° going toward —90°, and the phase of the fourth element 24 is passing through +90° going toward 0°. Still further, the excitation phase angles must be periodically varied in accordance with the variations in the spin angle $\varphi$ and is sinusoidal in the present example. Slight variations from sinusoidal modulation may be desirable to reduce the incidental spin modulation of the gain in the direction of the earth.

To show the gain improvement factor of the antenna array, the radiation field along the line 44 at an angle $\theta$ to the line 42 in the direction of the earth is considered. The normalized far field in the equatorial plane may be shown to be equal to $$E = e^{-j\frac{\pi}{2}[\cos \phi - \cos (\theta - \phi)]} + e^{-j\frac{\pi}{2}[\cos \phi - \cos )\theta - \phi)]} + e^{-j\frac{\pi}{2}[\sin \phi + \sin (\theta - \phi)]} + e^{-j\frac{\pi}{2}[\sin \phi + \sin (\theta - \phi)]}$$

This may be reduced to $$E = 2 \cos \left\{ \frac{\pi}{2} [\cos \phi - \cos (\theta - \phi)] \right\} + 2 \cos \left\{ \frac{\pi}{2} [\sin \phi + \sin \theta - \phi)] \right\}$$

Figure 5:
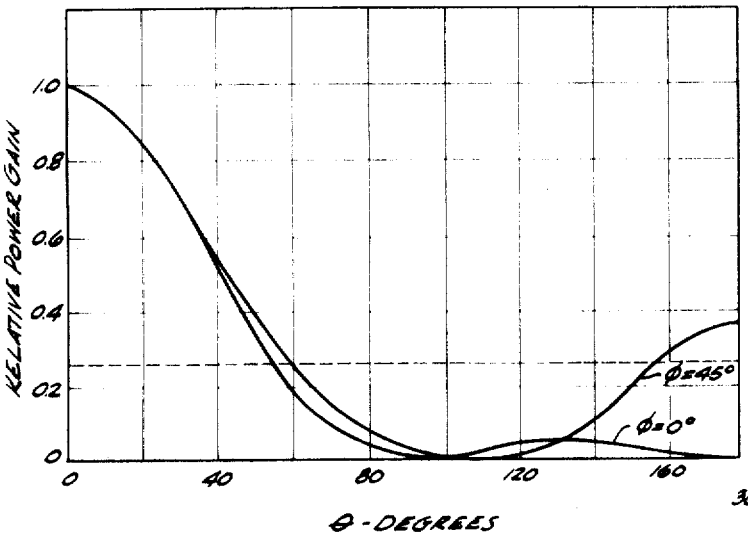
FIG. 5 is a graph of relative power gain as a a function of excitation phase angle between the antenna elements of FIG. 4.

FIG. 5 is a graph of the relative power gain $$\left( \frac{E}{4} \right)^2$$

of the antenna array as a function of $\theta$ for 2 values of $\varphi$ and represents the field pattern of the antenna array. It will be seen from FIG. 5 that the radiated field in the direction of the earth ($\theta = 0°$) is at a maximum (normalized to unity). The field decreases to approximately zero in the direction at right angles to the direction of the earth ($\theta = 90°$). However, minor side lobes are present, the most pronounced being in the direction opposite to the direction of the earth at that point in the spin cycle when the satellite spin angle $\varphi = 45°$. For comparative purposes, the straight horizontal broken line in FIG. 5 indicates the field of a directive antenna having a uniform circular, pancake-like pattern.

From the graph of FIG. 5, the power gain improvement factor of the array may be computed. When $\varphi = 0$ the improvement factor of the pencil beam is 6 decibels over the 8 decibel gain of a flat circular pattern, or a total of 14 decibels gain over an omnidirectional pattern. When $\varphi = 45°$, the present array is only 5 decibels greater than the gain of a circular pattern. This one decibel reduction of the improvement factor as the satellite 10 spins shows the deleterious effect of the close spacing of the antenna elements 21–24. However, the attained gain of 13–14 decibels of the present antenna array compares favorable with the 18 decibels optimum which corresponds to full earth coverage by a pencil beam.

The interconnection of the antenna element 21–24 with a radio transmitter 50 is shown in FIG. 6. The transmitter 50 is connected to a power divider which may be a unitary device or made up of several microwave bridge networks known as hybrid networks. In the present example, the transmitter 50 is connected to one terminal of a first directional coupler 51 having a second terminal terminated in its characteristic impedance by a resistive impedance element 52. The construction and operation of the directional coupler 51 is well known in the art. When the directional coupler 51 is connected as described, the signal energy appears at two terminals 53 and 54 at equal power levels but the signal at one terminal 53 lags the signal at the other terminal 54 by 90°. Each of these terminals 53 and 54 is individually connected by transmission lines 55 and 56 to one terminal of second and third directional couplers 57 and 58, respectively. The transmission line 56 interconnecting the first and third directional couplers 51 and 58 is one-quarter wavelength longer than the other transmission line 55 to compensate for the 90° phase difference of the signals between the terminals 53 and 54 of the first directional coupler 51. Hence, the signals applied to the second and third directional couplers 57 and 58 have an in-phase relationship as well as being equal in magnitude.

The second and third directional couplers 57 and 58 each have a terminal terminated in the characteristic impedance by resistive elements 60 and 61. The signal energy appears at two terminals 62 and 63 of the second directional coupler 57 equal in magnitude but the signal at one terminal 62 lags the signal at the other terminal 63 by 90°. Similarly, the signal energy appears at two terminals 64 and 65 of the third directional coupler 58 equal in magnitude but the signal at one terminal 64 lags the signal at the other terminal 65 by 90°. These terminals 62–65 of the second and third directional couplers 57 and 58 are each individually connected by transmission lines 67, 68, 70 and 71 to a different one of four controllable phase shifters 72–75. The lengths of the first and third transmission lines 67 and 70 are equal and the second and fourth transmission lines 68 and 71 are one-quarter wavelength longer to compensate for the phase difference of the signals at the terminals 62–65 of the second and third directional couplers 57 and 58. Hence, the signals applied to the phase shifters 72–75 have an in-phase relationship as well as being equal in magnitude. The directional couplers 51, 57 and 58 may be of the flat-strip transmission line type described on pages 78–80 of the book "Handbook of Tri-Plate Microwave Components," published in 1956 by Sanders Associates, Inc., Nashua, New Hampshire.

The controllable phase shifters 72–75 serve to modulate the phase of the signals to be applied to the antenna elements 21–24 to cause the beam or field pattern to rotate and provide a phase shift of ±90°. The phase shifters 72–75 comprise ferrite phase modulators utilizing a varying magnetic field to control the phase shift through a ferrite element. Other types of phase shifting devices may also be used, such as rotating half-wave plates, rotating capacitors, and varactor diode phase modulator. The latter device utilizes a semiconductor diode having a capacitance that varies with an applied control potential. An electro-mechanical type of phase shifter that may be used is described on pages 333–335 of the book "Principles and Applications of Waveguide Transmission" by George C. Southworth, published in 1950 by D. Van Nostrand Co., Inc., although the all-electronic type is more convenient. The control signals for the controllable phase shifters 72–75 are applied to control signal terminals 76, 77, 78 and 80. Each of the controllable phase shifters 72–75 is individually connected to a different one of the four antenna elements 21–24 by transmission lines of equal length. The first phase shifter 72 is connected to the first antenna element 21, the second phase shifter 73 is connected to the second antenna element 22, and the third and fourth phase shifters 74 and 75 are connected to the third and fourth antenna elements 23 and 24, respectively.

Figure 7:
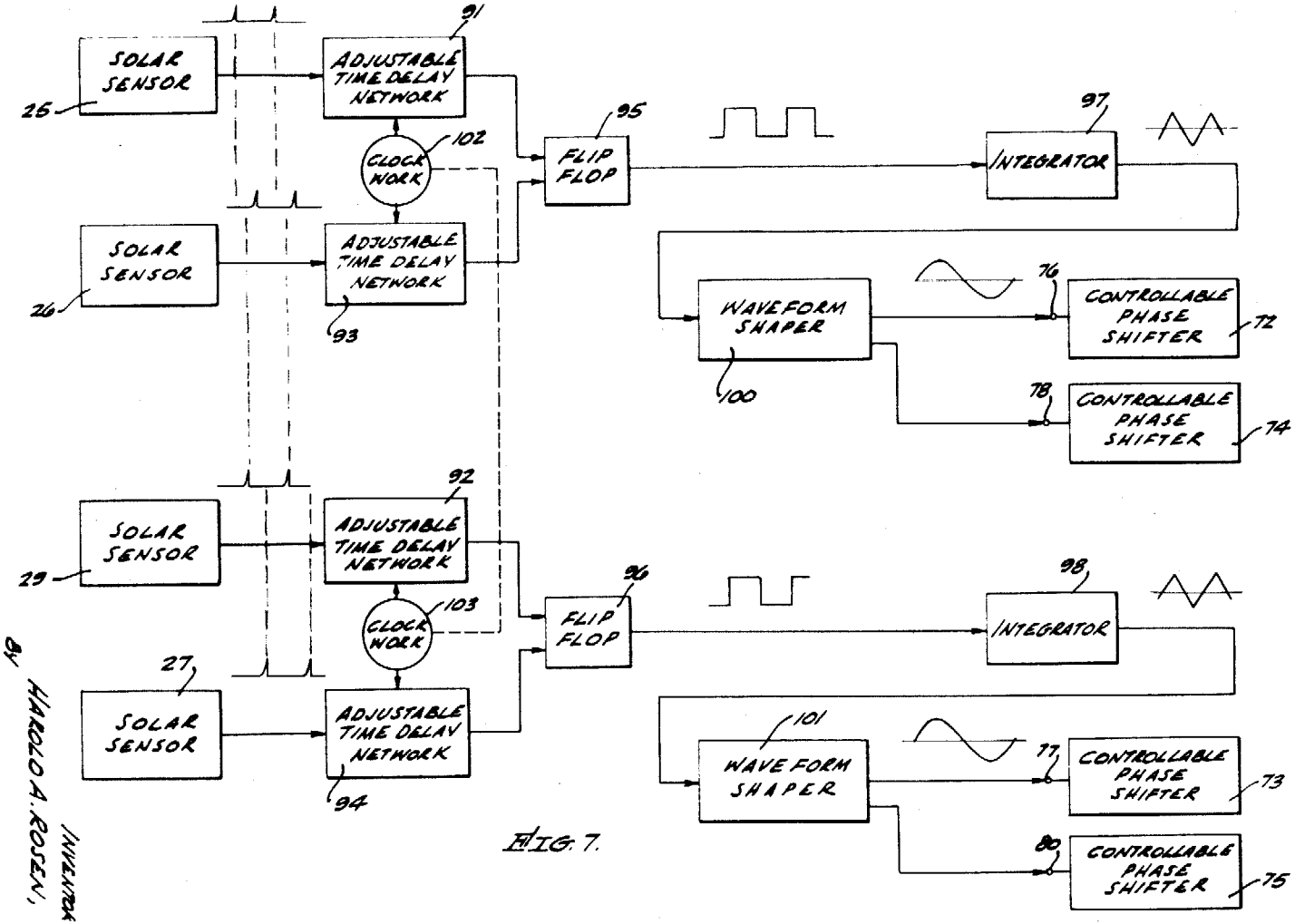

The phase shifters 72–75 are controlled by the synchronizing circuit schematically illustrated in FIG. 7. This circuit provides control voltages for each of the phase shifters 72–75 which produce relative phase shift between the antenna elements 21–24 necessary to cause the formation of a narrow beam field pattern and also sinusoidally varies the control voltages to cause the beam to rotate.

The four solar sensors 25, 26, 27 and 29 on the exterior of the satellite 10 are each electrically connected to a different one of four adjustable time delay networks 91–94. Each of the solar sensors 25, 26, 27 and 29 supplies an electrical pulse to the associated one of the delay networks 91–94 each time the satellite 10 rotates one complete revolution about the spin axis 15. The first solar sensor 25 associated with the first antenna element 21 is connected to the first delay network 91, the second solar sensor 29 associated with the second antenna element 22 is connected to the second delay network 92, and the third and fourth solar sensors 26 and 27 associated with the third and fourth antenna elements 23 and 24, respectively, are connected to the third and fourth delay networks 93 and 94, respectively. The adjustable delay networks 91–94 comprise resistance-capacitance circuits having mechanically variable impedance elements.

The first and third delay networks 91 and 93 are connected to a first bistable multivibrator circuit or flip flop 95 at the set and reset terminals thereof, respectively, and the second and fourth delay networks 92 and 94 are connected to the set and reset terminals of a second flip flop 96. The pulses from the solar sensors 25, 26, 27 and 29 are applied by the delay networks 91–94 to the flip flops 95 and 96, thereby causing the flip flops 95 and 96 to change state. The first and third solar sensors 25 and 26 are on diametrically opposed sides of the satellite 10 and alternately produce pulses each 180° of rotation thereof, resulting in a square wave being developed by the first flip flop 95. The second and fourth solar sensors 29 and 27 are also on diametrically opposed sides of the satellite 10, resulting in a square wave also being developed by the second flip flop 96, but displaced 90° from the square wave produced by the first flip flop 95.

Each of the flip flops 95 and 96 is individually connected to a different one of two integrators 97 and 98 that integrate the square waves to form triangular waves. The integrators 97 and 98 are each individually connected to a different one of two waveform shapers 100 and 101 that form the triangular waves into sine waves having a 90° relative phase difference. The waveform shapers 100 and 101 provide push-pull output signals, that is, the output signals appear at two terminals with equal amplitude but opposite in phase, or with a polarity inversion. The first wave form shaper 100 is connected to the control signal terminals 76 and 78 of the first and third controllable phase shifters 72 and 74. The sine wave control voltage applied to the third phase shifter 74 is inverted in polarity to provide 180° phase difference between the control signals applied to the first and third phase shifters 72 and 74. The second waveform shaper 101 is connected to the control signal terminals 77 and 80 of the second and fourth controllable phase shifters 73 and 75. The sine wave control voltage applied to the fourth phase shifter 75 is inverted in polarity to provide 180° phase difference between the control signals applied to the second and fourth phase shifters 73 and 75. Due to the 90° phase difference between the sine wave from the first waveform shaper 100 and the sine wave from the second waveform shaper 101 and due to the application of the sine waves with opposite polarity to the third and fourth controllable phase shifters 74 and 75, the control signals applied to the four phase shifters 72–75 have a fixed relative phase difference of 90°. That is, if the phase of the control signal applied to the first phase shifter 72 is taken as the reference phase or 0°, then the phase of the control signal at the second phase shifter 73 is 90°, at the third phase shifter 74 it is 180°, and at the fourth phase shifter 75 it is 270°. This produces the required relative phase variation of the radio signal applied to the antenna elements 21–24 to form the antenna field pattern into a narrow beam and to cause the field pattern to rotate in a direction counter to the spin of the satellite 10 and at the same angular velocity. This causes the beam to point in a fixed direction, namely, in the direction of the earth.

Inasmuch as the direction of the beam from the antenna array is determined in the present example by the direction of the sun, two clockwork mechanisms 102 and 103 are provided that compensate for movement of the earth with respect to the sun in order to maintain the antenna beam directed towards the earth. The clockwork mechanisms 102 and 103 are mechanically coupled together and are coupled to the mechanically variable impedance elements in the adjustable time delay networks 91–94 to progressively vary the phase shift of the pulses produced by the solar sensors 25, 26, 27 and 29. The clockwork mechanisms 102 and 103 shift the solar phase reference pulses 360° per day or for each revolution of the satellite around the earth. A clock accuracy of one part in 20,000 causes a beam aiming error of only 6° per year. This synchronizing arrangement may be corrected at relatively infrequent intervals by radio control signals from the earth, if desired. As an alternative to the clockwork mechanisms 102 and 103, synchronizing of the phase modulation with the spin cycle of the satellite to maintain the gain maximum point of the antenna array in the direction of the earth may be accomplished wholly by radio control from the ground. In this case, synchronizing signals would be transmitted to the satellite.

There has been described a directional antenna system for use with a spinning body wherein an antenna field pattern is maintained in a fixed direction. Although the present invention has been described with reference to use in a space vehicle such as a satellite, the invention is not limited thereto. The invention would also have significant utility in a radio beacon or, in radio direction finding apparatus. Furthermore, the invention may be utilized on a spinning body located in environments other than space.

Having thus described the invention and the present embodiments thereof, it is desired to emphasize the fact that many other modifications may be resorted to in a manner limited only by a just interpretation of the following claims.

What is claimed is:

1. A communication satellite comprising:

(*a*) a body adapted to spin about an axis;

(*b*) a plurality of antenna elements disposed symmetrically about said axis;

(*c*) controllable phase shifting means;

(*d*) circuit means coupled to said antenna elements through said controllable phase shifting means;

(*e*) means for developing synchronizing signals;

(*f*) and control means coupled to said last-named means and responsive to said synchronizing signals for developing control signals, said control means being coupled to said controllable phase shifting means for applying said control signals thereto.

2. In a communication satellite orbiting the earth and spinning about an axis, apparatus for directing an antenna radiation pattern toward the earth despite the spinning of the satellite by forming the radiation pattern into a narrow beam and couner rotating the beam in synchronism with the spin of the satellite, said apparatus comprising:

(*a*) a body adapted to spin about an axis;

(*b*) a plurality of longitudinal radiating elements mounted to and extending from said body parallel to said axis, said elements being symmetrically disposed about said axis, each of said elements being an array of radiators of the type which radiates in a direction perpendicular to said axis, said elements being spaced at least one-quarter wavelength away from said axis;

(*c*) a radio transmitter;

(*d*) a plurality of controllable phase shifters, each individually coupling one of said elements to said radio transmitter;

(*e*) a phase control circuit coupled to said phase shifters for controlling the phase shift thereof, said phase control circuit controlling the phase shift of said phase shifters in a manner such that radiation from said elements is formed into a beam, said phase control circuit varying the phase shift of said phase shifters such that said beam rotates around said axis counter to the spin of said body;

(*f*) and a synchronizing circuit responsive to solar radiation and coupled to said phase shift control circuit for synchronizing the rotation of said beam with the spin of said body.

3. Apparatus for producing a rotating directive antenna field pattern associated wtih a spinning body, the field pattern rotating counter to the spin of the body and at the same angular velocity comprising:

(*a*) a body adapted to spin about an axis;

(*b*) a plurality of antenna elements disposed on said body and equally spaced about said axis, the individual radiation field pattern of each of said antenna elements being substantially circular in a plane transverse to said axis;

(*c*) a radio transmitter associated with said body and producing a radio signal;

(*d*) means including a plurality of controllable phase shifters each coupling said transmitter to a different one of said antenna elements for varying the phase of said radio signal in response to applied control signals;

(*e*) means providing electrical pulses synchronized with the spin of said body about said spin axis;

(*f*) means coupled to said last-named means for developing in response to said pulses a plurality of sinusoidally varying control signals having a predetermined phase displacement therebetween;

(*g*) said control signals being applied to said controllable phase shifters;

(*h*) said phase shifters providing in response to said control signals a predetermined phase shift to said radio signal applied to different ones of said antenna elements and producing a sinusoidal phase variation of said phase shift causing the individual field patterns of said antenna elements to combine into a narrow directive antenna pattern rotating counter to the spin of said body and at the same angular velocity.

4. Apparatus for producing a rotating directive antenna field pattern associated with a spinning body, the field pattern rotating counter to the spin of the body and at the same angular velocity comprising:

(*a*) a body adapted to traverse an orbit around the earth and adapted to spin about an axis;

(*b*) a plurality of longitudinally extending antenna elements projecting from a surface of said body parallel to said axis and equally disposed therearound, the individual radiation field pattern of each of said antenna elements being substantially circular in a plane transverse to said axis;

(*c*) a radio transmitter associated with said body and producing a radio signal;

(*d*) means including a plurality of controllable phase shifters each coupling said transmitter to a different one of said antenna elements for varying the phase of said radio signal in response to applied control signals;

(*e*) means providing electrical pulses in response to for each revolution of said body around the earth; axis while traversing said orbit;

(*f*) adjustable time delay means coupled to said last-named means for delaying said pulses by selected amounts;

(*g*) a clockwork mechanism operatively coupled to said adjustable time delay means for producing a delay of said pulses progressively increasing to 360° for each revolution of said body around the earth;

(*h*) means coupled to said time delay means for developing a square wave in response to said pulses;

(*i*) and waveform shaping means coupled to said last-named means for forming said square wave into a plurality of sinusoidally varying control signals having a predetermined phase displacement therebetween;

(*j*) said control signals being applied to said controllable phase shifters;

(*k*) said phase shifters providing in response to said control signals predetermined sinusoidally varying phase shifts to said radio signal applied to different ones of said antenna elements causing the individual field pattern of said antenna elements to combine into a narrow directive antenna pattern rotating counter to the spin of said body and at the same angular velocity.

5. Apparatus for producing a rotating directive antenna field patterns of said antenna elements to combine pattern rotating counter to the spin of the body and at the same angular velocity comprising:

(*a*) a body adapted to traverse an orbit around the earth and adapted to spin about an axis;

(*b*) four longitudinally extending, collinear slot, coaxial antenna elements projecting from a surface of said body parallel to said axis and equally disposed therearound, the individual radiation field pattern of each of said antenna elements being substantially circular in a plane transverse to said axis;

(*c*) a radio transmitter associated with said body and producing a radio signal;

(*d*) a plurality of directional couplers coupled to said transmitter by transmission lines of predetermined length to provide four in-phase radio signals of equal amplitude;

(*e*) four controllable phase shifters each coupling said directional couplers to a different one of said antenna elements by transmission lines of a predetermined length for varying the phase of said four radio signals in response to applied control signals;

(*f*) four solar sensors fixed to said body and disposed symmetrically about said spin axis [;], said solar sensors each having a longitudinal aperture slit opening outwardly of said body for admitting solar radiation to a radiant energy detector disposed therewithin, each of said solar sensors being associated with a different one of said antenna elements and having said aperture slit aligned in a plane passing through said spin axis and the associated one of said antenna elements, said solar sensors producing an electrical pulse in response to solar radiation admitted by said aperture slits as said body spins about said spin axis while traversing said orbit;

(*g*) four adjustable time delay networks coupled to said solar sensors for delaying said pulses by selected amounts;

(*h*) clockwork mechanism operatively coupled to said adjustable time delay networks for producing a delay of said pulses progressively increasing to 360° for each revolution of said body around the earth;

(*i*) a pair of bistable multivibrators, each being individually coupled to a different, diametrically oppositely disposed pair of said solar sensors, said bistable multivibrators each developing a square wave in response to said pulses, said square waves being relatively displaced in time of occurrence by 90°;

(*j*) a pair of integrators each coupled to a different one of said multivibrators for forming said square waves into triangular waves;

(*k*) and a pair of waveform shapers each being coupled to a different one of said integrators for forming said triangular waves into first and second sinusoidal control signals having a 90° phase displacement therebetween;

(*l*) said first control signal being applied to the pair of said controllable phase shifters associated with a diametrically oppositely disposed pair of said antenna elements and said second control signal being applied to the remaining pair of said controllable phase shifters, each of said control signals being applied with opposite polarity to the associated pair of said phase shifters;

(*m*) said phase shifters providing in response to said control signals sinusoidally varying phase shifts of said four radio signals causing the individual field patterns of said antenna elements to combine into a narrow directive antenna pattern rotating counter to the spin of said body and at the same angular velocity.

*6. Apparatus for producing a rotatable directive antenna field pattern from an antenna array of the type having a plurality of substantially omnidirectional antenna elements arranged symmetrically about an axis whereby each element receives radiation from the others comprising:*

*(a) a support;*

*(b) a plurality of antenna elements disposed on said support substantially symmetrically about an axis, said antenna elements having individual characteristic radiation field patterns substantially circular in a plane transverse to said axis;*

*(c) a source of a radio frequency signal;*

*(d) means including a plurality of electrically controllable electrical phase shifters, each of said phase shifters continuously and simultaneously coupling said source to an individual one of said antenna elements for varying the phase of the radio frequency signal fed thereto by varying an electrical parameter of said phase shifters while all portions thereof remain stationary, said means also including unidirectional transmission means having energy dissipation means;*

*(e) an electrical control means for applying electrical control signals to said phase shifters and adapted to effect relative phase shifts of the radio frequency signals fed to said antenna elements so that the radiated signals from said antenna elements form a directive antenna field pattern, said control means being operable to vary said electrical control signals to effect rotation of said field pattern relative to said axis in a plane substantially transverse thereto.*

*7. Apparatus for producting a rotatable directive antenna field pattern from an antenna array of the type having a plurality of substantially omnidirectional antenna elements arranged symmetrically about an axis whereby each element receives radiation from the others comprising:*

*(a) a support;*

*(b) a plurality of antenna elements disposed on said support substantially in parallel, equally spaced relation about a central axis, said antenna elements having individual characteristic radiation field patterns substantially circular in a plane transverse to said axis;*

*(c) a source of radio frequency signal;*

*(d) power splitting means including unidirectional transmission means having energy dissipation means;*

*(e) a plurality of electrically controllable electrical phase shifters for varying the phase of a radio frequency signal by varying an electrical parameter of said phase shifters while all portions thereof remain stationary;*

*(f) means continuously and simultaneously connecting each of said antenna elements to said radio frequency signal source through said power splitting means and phase shifters;*

*(g) an electrical control means for applying electrical control signals to said phase shifters and adapted to effect relative phase shifts of the radio frequency signals applied to said antenna elements so that the signals radiated from said elements form a directive pattern at substantially a right angle to said axis, said control means being operable to vary said electrical control signals to effect angular movement of said directive pattern relative to said axis in a plane substantially transverse thereto.*

*8. The apparatus in claim 6 in which said control means includes:*

*(a) means for generating a series of pulses;*

(*b*) *means for forming sinusoidal signals from said pulses;*

(*c*) *and means controlling said phase shifters in accordance with said sinusoidal signals to effect said rotation of said directive antenna field pattern at a speed determined by the frequency of generation of said pulses.*

*9. The apparatus defined in claim 7 in which said control means includes:*

(*a*) *means for generating a series of pulses;*

(*b*) *means for forming sinusoidal signals from said pulses;*

(*c*) *and means for varying said control signals in accordance with said sinusoidal signals to effect said angular movement of said directive pattern at a speed determined by the frequency of generation of said pulses.*

References Cited

The following references, cited by the Examiner, are of record in the patented file of this patent or the original patent.

UNITED STATES PATENTS

| | | | |
|---|---|---|---|
| 2,831,190 | 4/1958 | Trinter | 343—854 |
| 2,968,808 | 1/1961 | Russell | 343—854 |
| 3,090,956 | 5/1963 | Woodward et al. | 343—106 X |
| 3,255,450 | 6/1966 | Butler | 343—100 |
| 3,041,605 | 6/1962 | Goodwin et al. | 343—100 |

RODNEY D. BENNETT, Jr., Primary Examiner

R. E. BERGER, Assistant Examiner

U.S. Cl. X.R.

325—4; 343—106